United States Patent
Gürtler et al.

(10) Patent No.: US 7,732,498 B2
(45) Date of Patent: Jun. 8, 2010

(54) PROCESS FOR PREPARING DISPERSIBLE NANOPARTICLES

(75) Inventors: Christoph Gürtler, Köln (DE); Paula Cristina Alves Rodrigues, Düsseldorf (DE); Arno Nennemann, Bergisch Gladbach (DE); Lars Krueger, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 408 days.

(21) Appl. No.: 11/701,007

(22) Filed: Feb. 1, 2007

(65) Prior Publication Data
US 2008/0004356 A1    Jan. 3, 2008

(30) Foreign Application Priority Data
Feb. 4, 2006    (DE) ........................ 10 2006 005 165

(51) Int. Cl.
*B01F 17/00* (2006.01)
*B01F 3/08* (2006.01)

(52) U.S. Cl. ....................................... 516/200; 516/22

(58) Field of Classification Search .................. 516/200
See application file for complete search history.

(56) References Cited

U.S. PATENT DOCUMENTS

| | | | | |
|---|---|---|---|---|
| 4,508,767 A | * | 4/1985 | Hokamura et al. | 427/407.1 |
| 4,708,753 A | * | 11/1987 | Forsberg | 149/2 |
| 5,049,322 A | * | 9/1991 | Devissaguet et al. | 264/4.1 |
| 7,001,975 B2 | | 2/2006 | Bremser et al. | 528/75 |
| 7,205,356 B2 | | 4/2007 | Gürtler et al. | 524/590 |
| 2003/0138557 A1 | * | 7/2003 | Allison | 427/213.3 |
| 2004/0220326 A1 | * | 11/2004 | Gurtler et al. | 524/589 |
| 2004/0234487 A1 | | 11/2004 | Bremser et al. | 424/70.17 |

OTHER PUBLICATIONS

Marcianò et al. "A simple method to prepare solid nanoparticles of water-soluble salts using water-in-oil microemulsions", Mar. 30, 2000, Colloid & Polymer Science 278: 250-252, Springer Berlin/Heidelberg.*

Marciano V et al: "A Simple Method to Prepare Solid Nanoparticles of Water-Soluble Salts Using Water-in-oil Microemulsions" Colloid & Polymer Science. Springer Verlag, Heidelberg, E, Bd. 278, Nr. 3, 2000, Seiten 250-252, XP009081160.

* cited by examiner

*Primary Examiner*—Ling-Siu Choi
*Assistant Examiner*—Chun-Cheng Wang
(74) *Attorney, Agent, or Firm*—Connolly Bove Lodge & Hutz LLP

(57) ABSTRACT

The present invention relates to innovative nanoparticles, to a process for preparing nanoparticles by recrystallization, and to the use thereof.

14 Claims, No Drawings

PROCESS FOR PREPARING DISPERSIBLE NANOPARTICLES

CROSS-REFERENCE TO RELATED APPLICATIONS

The present application claims the right of priority under 35 U.S.C. §119 (a)-(d) of German Patent Application Number 10 2006 005165.3, filed Feb. 4, 2006.

BACKGROUND OF THE INVENTION

The present invention relates to innovative nanoparticles, to a process for preparing the nanoparticles by recrystallization, and to the use thereof.

Water-soluble compounds, namely molybdates, especially lithium molybdate, possess great interest as catalysts for accelerating the reaction of aqueous two-component polyurethane ("2K PU") applications, since they contribute to accelerating the reaction without adversely affecting the pot life of the system.

Alkali metal molybdates are water-soluble, and so typically can be incorporated directly into the aqueous 2K PU formulations. Direct incorporation into a water-free component or composition, such as the isocyanate component, is not immediately possible in this way, since the alkali metal molybdates are normally in coarsely crystalline form and are insoluble or virtually so in the organic medium, thereby ruling out homogeneous incorporability. Moreover, the free NCO groups would react with the water of an aqueous molybdate solution, which is likewise unwanted.

It was an object of the present invention, therefore, to provide nanoparticles which can be formulated homogeneously in organic media in order to allow direct incorporation into water-free paint binders or crosslinkers.

This object has now been achieved by means of dispersible nanoparticles which have an average particle size of less than 500 nm. These particles are obtainable by means of a special preparation process.

SUMMARY OF THE INVENTION

The present invention provides a process for preparing dispersible nanoparticles of water-soluble compounds having an average particle size of less than 500 nm, comprising I) preparing a water-in-oil emulsion from
   A) an aqueous solution of one or more water-soluble compounds,
   B) an organic solvent or solvent mixture and
   C) stabilizers;

and then

II) removing the water present down to a residual water content of not more than 2% by weight based on the end product.

The invention further provides dispersible nanoparticles of water-soluble compounds made in accordance with the process, said nanoparticles having an average particle size of less than 500 nm.

DETAILED DESCRIPTION OF THE PREFERRED EMBODIMENTS

The particle sizes reported in the context of the present invention were measured in accordance with Khrenov et al. (2005, Macromolecular Chemistry and Physics 206, p. 96ff.) by means of dynamic light scattering in particle number weighting.

Water-soluble compounds for preparing the particles of the invention may be all of the organic or inorganic compounds known to the skilled person that exhibit solubility in water. Examples of those suitable are metal salts such as, preferably, molybdates.

Molybdates are understood to be the salts of molybdic acid $H_2MoO_4$ and the polyacids thereof which are obtained by reacting the acids with bases. Where alkali metal hydroxides or alkaline earth metal hydroxides are used as bases, alkali metal molybdates or alkaline earth metal molybdates are obtained.

In the context of the present invention preferred molybdates are lithium molybdate, sodium molybdate and zinc molybdate.

Particularly preferred dispersible nanoparticles of the inventive kind are lithium molybdate particles having an average particle size of 5 to 60 nm.

For the subject of the invention it is immaterial whether the particles are crystalline or amorphous.

An aqueous solution of a water-soluble compound is, for the purposes of the present invention, a homogeneous solution of the respective compound at the respective temperature in water as solvent, the compound being fully dissolved therein and there being no observed precipitation of solids in the solution. These aqueous solutions may contain up to 5% by weight of a non-water solvent. Preferably they contain exclusively water as their solvent.

Preferably A), B) and C) are employed in a proportion to one another such that, based on the resulting total mixture before step D), there are 0.01% to 50% by weight of water, 40% to 99.9% by weight of organic solvent, 0.001% to 40% by weight of compound to be precipitated in nanoparticle form and 0.01% to 60% by weight of stabilizer.

With particular preference the composition of the mixture before step D) is 1% to 20% by weight of water, 50% to 98.8% by weight of organic solvent, 0.005% to 10% by weight of compound to be precipitated in nanoparticle form and 0.1% to 20% by weight of stabilizer.

With very particular preference the composition of the mixture before step D) is 2% to 10% by weight of water, 79% to 97% by weight of organic solvent, 0.01% to 1% by weight of compound to be precipitated in nanoparticle form and 0.1% to 10% by weight of stabilizer.

The emulsion which forms when components A) to C) are combined comprises swollen micelles or droplets of the water-dissolved compound in the organic solvent as a continuous phase, these micelles or droplets being stabilized by the stabilizer C). The micelle or droplet sizes, measured by means of TEM (after freeze-etching and carbon-coating), dynamic light scattering or laser diffraction, are typically 10 nm to 50 000 nm, preferably 10 nm to 5000 nm, more preferably 10 to 500 nm, very preferably 10 nm to 100 nm. In the latter case the emulsions are referred to as microemulsions.

Microemulsions are generally characterized by a high transparency, governed by droplet sizes of less than 100 nm and low interfacial energies of less than 0.1 mN/m. In the presence of salts in aqueous solution and of polymeric additives, the transparency may decrease and the interfacial energy may increase, and yet despite this the emulsions form spontaneously—that is, there are thermodynamically favoured systems. In the process of the invention, use was made preferably of microemulsions which are self-dispersing after simple mixing of components A) to C) and gentle shaking.

In component A) it is preferred to use compounds having a water solubility of at least 0.1 g/100 g of solvent, preferably 1 to 89.6 g/100 g of water at 25° C. (i.e. room temperature).

To prepare the aqueous solutions for use in accordance with the invention it is preferred to use fully demineralized water having a conductivity of less than 5 µS/cm.

Particular preference is given to using molybdate salts in A), preferably lithium molybdate, sodium molybdate or zinc molybdate, more preferably lithium molybdate.

The solutions used in A) typically have concentrations of the dissolved compound in question of 0.01% to 40% by weight, preferably 0.1% to 30% by weight, more preferably 0.5% to 20% by weight.

In B) it is possible to use all typical organic solvents which are not infinitely miscible with water and so are able to form a two-phase mixture with water. These are, for example, octane, decane, dodecane, halogenated hydrocarbons such as 1,2-dichloroethane, aromatic solvents such as toluene, xylene, SOLVESSO (heavy aromatic naphtha, brand name of Exxon Mobile, Houston, USA), and compounds containing ether and/or ester groups.

Preference is given to using in B) butyl acetate, methoxypropyl acetate, ethyl acetate, caprolactone, SOLVESSO, toluene, xylene and/or mixtures thereof. Butyl acetate is particularly preferred.

In one preferred embodiment the solvent used in B) is saturated beforehand with water: in other words, water is added to the organic solvent or solvent mixture until a two-phase mixture forms at the prevailing temperature. The supernatant solvent is then saturated with water and can be used in B).

Suitable stabilizers C) are nonionic surfactants, anionic surfactants and cationic surfactants and also block copolymers or polyelectrolytes. In the presence of low molecular weight surfactants with molecular weights of less than 1000 g/mol, cosurfactants such as alkanols with $C_1$-$C_{10}$ carbon chains may be necessary.

Preferred stabilizers are polymers, more preferably block copolymers which in accordance with Foerster and Antonietti (Foerster, S. & Antonietti, M., Advanced Materials, 10, no. 3, (1998) 195), carry a solvate block for interaction with the solvent and a functional block for interaction with the particle surface. Solvate blocks differ in their hydrophilicity/hydrophobicity and may be poly(styrenesulfonic acid) (PSSH), poly(n-alkylvinylpyridinium halide) (PQ2VP, PQ4VP), poly(methacrylic acid) (PMAc, PAAc), poly(methacrylates) (PMA), poly(N-vinylpyrrolidone) (PVP), poly(hydroxyethyl methacrylate) (PHEMA), poly(vinyl ethers) (PVE), poly(ethylene oxide) (PEO), poly(propylene oxide) (PPO), poly(vinyl methyl ether) (PVME), poly(vinyl butyl ether) (PVBE), polystyrene (PS), poly(ethylenepropylene) (PEP), poly(ethylethylene) (PEE), poly(isobutylene) (PIP), poly(dimethylsiloxane) (PDMS), partially fluorinated blocks (PF).

Functional blocks are notable for the capacity for specific interaction with the particle surfaces to be formed. Such interactions may be of ligand, acid-base, electrostatic, complex or low-energy interaction type, thus for example poly(N-alkylvinylpyridinium halide) (PQ2VP, PQ4VP), poly(dimethylsiloxane) (PDMS), partially fluorinated blocks (PF), poly(ethylene oxide) (PEO), specific ligand-containing blocks (PL; e.g. blocks containing mercapto groups for metal-mercapto interactions etc.), poly(methacrylic acid) (PMAc), poly(styrenesulfonic acid) (PSSH), poly(cyclopentadienylmethylnorbornene) (PCp; e.g. interactions with transition metals via metallocene complexing), poly(amino acid) blocks (PA; e.g. "site-specific drug delivery", biomineralization).

For the process of the invention it is particularly preferred to use PEO-PPO-PEO- or PPO-PEO-PPO block copolymers, copolymers with poly(ethylene oxide-poly(methyl methacrylate) blocks, (PEO-PMMA) or poly(ethylene oxide)-poly(n-butyl acrylate) blocks (PEG-nBA) or polyoxyalkylene-amines (e.g. Jeffamines, from Huntsman). These preferably have molar masses of 400 to 20 000 g/mol, preferably 1000 to 10 000 g/mol (molar masses according to DIN53240 OH number determination).

Very particular preference is given to using block copolymers having PEO-PPO-PEO blocks with molar masses of 2000 to 10 000 g/mol (molar masses according to DIN53240 OH number determination), such as those sold by BASF, Ludwigshafen, DE under the name PLURONIC®.

Components A) to C) can be mixed in any order; preferably the stabilizers are added to component B) before A) and B) are mixed with one another.

The mixing of the aqueous phase with the organic phase takes place with stirring and/or with supply of increased energy by means for example of high-pressure homogenization, rotor-stator systems, Turrax, ultrasound, magnetic stirrers or other dispersion methods, preferably with stirring by means of conventional stirrers such as magnetic stirrers or rotor-stator systems.

The process is carried out preferably at temperatures of 0° C. to 150° C., more preferably 0° C. to 80° C., very preferably 20 to 60° C.

The water still present in the system after the mixing of A) to C) must be removed by step D). Suitable for this purpose are the addition of drying agent, distillative methods, raising the solubility of water in the organic phase by means of polar solvent additions, spray-drying or freeze-drying.

Preferably the water is removed by means of drying agents appropriate to the solvent, such as silica gel, or distillative methods.

Preferably the residual amount of water in the resulting stable dispersions of the particles of the invention is less than 1% by weight, more preferably less than 0.5% by weight.

This virtually complete removal of the water present is essential to success, since otherwise the crystallization or amorphous precipitation of the salts present in the water, and hence the formation of particles, do not occur.

If in D) only the water and not the organic solvent present as well is removed, then dispersions of the desired nanoparticles in this organic medium are obtained.

As well as the water, though, the organic solvent present can be removed as well, in which case powders or gels are obtained. As a result of the fact that the particle surface is coated with the stabilizers added through component C), there is no irreversible agglomeration between the individual particles. Consequently such powders or gels are redispersible—that is, as a result of adding organic solvents, of the kind specified, for example, in relation to component B) of the process of the invention, to these powders or gels, it is possible to prepare finely divided dispersions of the nanoparticles again without a substantial increase in the fraction of agglomerates in relation to dispersions which are obtained after the sequence of process steps A) to D).

The particles obtainable in accordance with the invention possess the aforementioned average particle sizes, with less than 10%, preferably less than 5%, more preferably less than 1% of the particles having sizes of more than 500 nm, preferably more than 350 nm, more preferably more than 200 nm. The size distributions were determined in accordance with Khrenov et al. (2005, Macromolecular Chemistry and Physics 206, p. 96ff.) by means of dynamic light scattering in particle number weighting and transmission electron microscopy via image evaluation. Coarse particles of this kind may come about for reasons which include irreversible agglomeration during the production of the gels or powders and are therefore unwanted, since the fine division of the dispersions produced from such particles suffers and makes homogeneous incorporability more difficult. Such particles are therefore referred to as the coarse fraction. If desired it is possible to remove small amounts of coarse fraction by filtration.

In view of this unique combination of average particle size and low coarse fraction it is possible to formulate particles of the parent water-soluble salts homogeneously in organic media. Such dispersions may even have long-term stability—that is, even after months of storage, there is no solid deposit at all. If a solid deposit should nevertheless occur, it can be removed by simple shaking or stirring of the storage vessel, with the particles deposited transferring back into the disperse phase. Deposition of hard constituents or of gel particles which are not redispersible does not occur.

The preparation of the invention has the advantage that it involves a kind of recrystallization of the salt in question, the desired nanoparticles being obtained free of by-product and there being no need for any further work-up steps, such as removal of salts, after the water has been separated off.

Additionally provided, therefore, are dispersions comprising the water-soluble particles prepared in accordance with the invention, preferably molybdate particles having an average particle size of less than 500 nm.

These dispersions typically have solids contents of 0.001% to 50% by weight, preferably 0.002% to 20% by weight, more preferably 0.005% to 5% by weight, very preferably 0.01% to 1% by weight.

The particles of the invention may additionally be obtained as redispersible gels or powders, by completely separating off solvent and water by distillative methods or filtration. These gels or powders typically have solids contents of 0.1% to 75% by weight, preferably 0.5% to 50% by weight, more preferably 0.5% to 35% by weight of the nanoparticulate salt in stabilizer matrix. The residual level of water and organic solvent is typically less than 5% by weight, preferably less than 1% by weight, based on the powder or gel obtained.

The particles of the invention, preferably in the form of dispersions in organic media, can be dispersed into hydrophobic media such as isocyanates, for example, which allows stable dispersions of these particles in the respective isocyanate to be obtained.

The molybdate particles of the invention and their dispersions are especially suitable as catalysts for aqueous polyurethane applications.

The invention further provides, in this context, for the use of the molybdate particles of the invention as catalysts for aqueous 2K PU applications.

Besides molybdate salts it is also possible in component A) to use other water-soluble compounds which meet the above criteria of the salts of component A).

Examples are sodium chloride, silver nitrate, sodium glutamate, water-soluble, active therapeutic substances such as polypeptides, polysaccharides or polynucleotides, water-soluble corrosion inhibitors such as chromates, flame retardant additives such as polyphosphates, phosphonates, aluminium hydroxide, silica, water-soluble organic redox indicators and pH indicators.

By this means it is possible by the process of the invention to prepare not only molybdates but also other water-soluble compounds in nanoparticulate form, which may then be used not just for applications in the materials and plastics sector but also in the foodstuffs, health or crop protection sector.

The invention accordingly also provides for the use of the particles or dispersions, obtainable in accordance with the invention, in, or in the production of, materials of construction, coatings, adhesives and sealants, and products for the foodstuffs, crop protection and pharmaceutical sectors.

The following are examples of such further applications:

formulation of water-soluble active therapeutic substances such as polypeptides, polysaccharides or polynucleotides which otherwise exhibit low bioavailability (see patent US20030138557). Through controlled stabilization/functionalization as nanoparticles it is possible for the active substances to be protected against premature dissolution in an aqueous environment, to be transported in a targeted way via organic media (including through biological membranes), and, as a result of the nanoscale size, to be taken up into cells.

Examples of water-soluble, therapeutically active proteins, peptides, polynucleotides, anticoagulants, cancer remedies, diabetes agents, antibiotics, etc., are listed in US20030138557.

Formulation of sodium chloride, sodium glutamate or other water-soluble flavour and aroma substances, for which an oily formulation can be of interest. Thus it is possible for water-soluble substances such as, for example, sodium chloride and sodium glutamate, as flavour substances, to be incorporated into water-free food formulations without disrupting the transparency, formulation of active antibacterial substances water-soluble redox or pH indicators, polar, inorganic silica particles can be precipitated by way of the process essential to the invention.

EXAMPLES

PEO-PPO-PEO block copolymer (BASF, Ludwigshafen, Germany): PLURONIC® PE10500, PLURONIC® P123, PLURONIC® PE 6120; PPO-PEO-PPO block copolymers (BASF, Ludwigshafen, Germany): PLURONIC® RPE 1740, PLURONIC® RPE 1720; PMMA-PEO block copolymer (Goldschmidt, Essen, Germany): TEGOMER® ME1010 (Tego GmbH, Essen, Germany); nonionic surfactant BRIJ 30 (PEO-(4)-lauryl alcohol, Fluka Chemie AG, Buchs, Switzerland); aminic surfactant GENAMIN® T150 (EO-(2)-tallowamine, Clariant, Gendorf, Germany),

| PEO-PPO-PEO block copolymers (with OH end group functionality): | | |
|---|---|---|
|  | Molar mass of molecule [g/mol] | Molar mass of polypropylene glycol block [g/mol] |
| PLURONIC ® PE10500 | 6500 | 3250 |
| PLURONIC ® P123 | 5780 | 4046 |
| PLURONIC ® PE 6120 | 2100 | 1750 |

(molar masses to DIN53240 via OH number determination)

| PPO-PEO-PPO block copolymer (with OH end group functionality): | | |
|---|---|---|
|  | Molar mass of molecule [g/mol] | Molar mass of polypropylene glycol block [g/mol] |
| PLURONIC ® RPE 1740 | 2150 | 1720 |
| PLURONIC ® RPE 1720 | 2650 | 1590 |

(molar masses to DIN53240 via OH number determination)

Polyisocyanate Component (a) Employed:

(a1) DESMODUR® N3300, hexamethylene diisocyanate trimer hydrophilicized by a polyether radical, NCO content 21.8% by weight, viscosity at 23° C. 2500 mPas, Bayer MaterialScience AG, Leverkusen, DE.

(a2) BAYHYDUR® 3100, hexamethylene diisocyanate trimer hydrophilicized by a polyether radical NCO content 17.4% by weight, viscosity at 23° C. 2800 mPas, Bayer MaterialScience AG, Leverkusen, DE.

(a3) BAYHYDUR® XP2487, anionically hydrophilicized polyisocyanate, NCO content 20.6% by weight, viscosity at 23° C. 5400 mPas, Bayer MaterialScience AG, Leverkusen, DE.

(a4) BAYHYDUR® VP LS 2319, hexamethylene diisocyanate trimer hydrophilicized by a polyether radical, NCO content 18.0% by weight, viscosity at 23° C. 4500 mPas, Bayer MaterialScience AG, Leverkusen, DE.

(a5) BAYHYDUR LPLAS 5642, anionically hydrophilicized polyisocyanate, NCO content 20.6% by weight, viscosity at 23° C. 3500 mPas, Bayer MaterialScience AG, Leverkusen, DE.

Example 1

Preparation of Microemulsions from Water, Butyl Acetate and Stabilizer

In each case 50 μl of water were dispersed in 5 ml of water-saturated butyl acetate. Dispersion was carried out with ice cooling, using a Branson 250D ultrasonic disintegrator (3 mm tip, two times 30 seconds, 17% amplitude). The type and amount of surfactant and block copolymer were varied. An indication of microemulsions resulted from visually ascertained, optical transparency and/or from high transmittance values (>90%) and low interfacial tensions (<1 mN/m) of the emulsions. Transparent microemulsions were obtained for the following ternary mixtures and water/butyl acetate/stabilizer ratios (W/O/S in weight fractions w/w/w):

| Stabilizer | W/O/S w/w/w |
|---|---|
| PLURONIC® PE10500 | 2/178/1 |
| PLURONIC® RPE 1740 | 0.2/17.8/1 |
| BRIJ 30 | 0.2/17.8/1 |
| TEGOMER® ME1010 | 1/89/1 |
| GENAMIN® T150 | 0.5/44.5/1 |

Example 2

Preparation of a Microemulsion from Aqueous Lithium Molybdate Solution, Butyl Acetate and PLURONIC® P123

A 50 ml cylinder was charged with 25 ml of water-saturated butyl acetate and 0.5 ml of a 2% by weight aqueous lithium molybdate solution. In 0.1 ml steps, PLURONIC® P123 solution (100 g/l in butyl acetate) was added. After a total of 3.8 ml had been added the emulsion was clear and colourless. A marked clarification was apparent after just about 3.2 ml. Following each addition the emulsion was shaken thoroughly. A transparent 2% by volume water-in-oil microemulsion of aqueous lithium molybdate solution in butyl acetate was obtained correspondingly by adding 0.5 ml of a 2% w/w aqueous lithium molybdate solution to 25 ml of butyl acetate in the presence of 13.2 g of PLURONIC® P123/L emulsion. The salt content of the emulsion was 390 ppm, the water/surfactant ratio 1.32 ml of aqueous lithium molybdate solution (2% by weight) per gram of PLURONIC® P123. This corresponds to a ternary mixture of aqueous lithium molybdate solution/butyl acetate/stabilizer in the following ratio: 1.3/58.6/1 (W/O/S in weight fractions w/w/w). From TEM micrographs (carbon coating impression following freeze-etching), by means of image evaluation, an average droplet size of 19±6 nm was obtained.

Example 3

Particle Precipitation of Lithium Molybdate Nanoparticles: Variation of Surfactant, Block Copolymer and Lithium Molybdate Concentration The clear emulsions from Example 1 were treated, at corresponding surfactant and block copolymer contents, with aqueous lithium molybdate solution (0.05%, 0.5% and 5% w/w lithium molybdate/water) and the water was removed by silica gel (Bohlender GmbH, drying beads, orange). Approximately 1.2 g of silica gel beads were used for each 5 ml batch for the purpose of separating off water. The particle size measurements then took place by means of dynamic light scattering (Brookhaven BIC90, particle number-weighted log-normal evaluation) following filtration through a 0.45 μm syringe prefilter (Millipore, Millix HV).

| Stabilizer | W/O/S w/w/w | Particle diameter Particle number-weighted log-normal [nm] |
|---|---|---|
| 0.05% lithium molybdate in aqueous phase | | |
| TEGOMER® ME 1010 | 1/88/1 | 152 |
| | 0.5/44/1 | 144 |
| PLURONIC® PE 10500 | 2/176/1 | 214 |
| | 1.4/127/1 | 5 |
| BRIJ 30 | 02/17.6/1 | 67 |
| PLURONIC® RPE 1740 | 0.2/17.6/1 | 142 |
| GENAMIN® T150 | 0.5/44/1 | 118 |
| 0.5% lithium molybdate in aqueous phase | | |
| TEGOMER® ME 1010 | 1/88/1 | 128 |
| | 0.5/44/1 | 177 |
| PLURONIC® PE 10500 | 2/176/1 | 55 |
| | 1.4/127/1 | 67 |
| BRIJ 30 | 02/17.6/1 | 138 |
| PLURONIC® RPE 1740 | 0.2/17.6/1 | 121 |
| GENAMIN® T150 | 0.5/44/1 | 118 |
| 5% lithium molybdate in aqueous phase | | |
| TEGOMER® ME 1010 | 1/88/1 | 3 |
| | 0.5/44/1 | 10 |
| PLURONIC® PE 10500 | 2/176/1 | 17 |
| | 1.4/127/1 | 21 |
| BRIJ 30 | 02/17.6/1 | 432 |
| PLURONIC® RPE 1740 | 0.2/17.6/1 | 198 |
| GENAMIN® T150 | 0.5/44/1 | 155 |

Example 4

Preparation of Nanoscale Lithium Molybdate with PLURONIC® PE 10500 from 5% by Weight Aqueous Lithium Molybdate Solution (W/O/S: 1/17.8/1)

A dispersion of 2750 ppm of nanoparticulate lithium molybdate in butyl acetate was prepared as follows. 6 ml of butyl acetate with 50 g/l PLURONIC® PE10500 were admixed with 290 μl of 5% by weight aqueous lithium molybdate solution. The emulsion was shaken and thrice heated to 80° C. and cooled again at RT. The addition of approximately 1.5 g of silica gel beads for dewatering took place at 80° C. during the last heating. After 10 minutes the supernatant, dewatered dispersion was removed from the drying agent. The Karl Fischer water contents (DIN ISO 17025) were <0.5% by weight. The particle size measurements were made, without filtration, by means of dynamic light scattering (Brookhaven, BIC 90). Particle number-weighted log-normal evaluation gave particle sizes of 64 nm.

Example 5

Preparation of Nanoscale Lithium Molybdate with PLURONIC® PE 10500 from 20% by Weight Aqueous Lithium Molybdate Solution (W/O/S: 1.27/17.8/1)

A dispersion of 14390 ppm of nanoparticulate lithium molybdate in butyl acetate was prepared as follows. 10 ml of butyl acetate with 50 g/l PLURONIC® PE10500 were admixed with 633 µl of 20% by weight aqueous lithium molybdate solution and processed further as in example 4. The particle size measurements were made by means of dynamic light scattering (Brookhaven, BIC 90). Particle number-weighted log-normal evaluation gave particle sizes of 101 nm.

Example 6

Preparation of Nanoscale Lithium Molybdate with PLURONIC® PE 10500 from 2% by Weight Aqueous Lithium Molybdate Solution (W/O/S: 1.27/17.8/1)

A dispersion of 1436 ppm of nanoparticulate lithium molybdate in butyl acetate was prepared as follows. 25 ml of butyl acetate with 50 g/l PLURONIC® PE10500 were admixed with 1580 µl of 2% by weight aqueous lithium molybdate solution. The emulsion was shaken briefly and twice heated to about 60° C. and cooled again at RT. The water was removed in a rotary evaporator at 40° C. and about 30 mbar and the volume was concentrated to approximately one third. The Karl Fischer water contents (DIN ISO 17025) were <0.5% by weight. The particle size measurements were made by means of dynamic light scattering (Brookhaven, BIC 90). Particle number-weighted log-normal evaluation gave particle sizes of 110 nm (measured neat) and 54 nm (after dilution in butyl acetate by making up to an initial volume of 25 ml).

Example 7

Nanoscale Lithium Molybdate in Isocyanates

Two stock dispersions, A and B, were prepared in accordance with example 6. In this case stock dispersion A was prepared with a concentration of 1400 ppm of lithium molybdate in butyl acetate and was dewatered by means of a rotary evaporator at 40° C. and about 30 mbar. Stock dispersion B was prepared at a concentration of 1000 ppm of lithium molybdate in butyl acetate and was dewatered by means of a rotary evaporator at 40° C. and about 30 mbar and also, subsequently, by addition of silica gel (12 g, 15-minute exposure time). The Karl Fischer water contents (DIN-ISO 17025) were <0.5% by weight.

Portions of 0.5 g of each of stock dispersions A and B were added to 4.5 g portions of isocyanate and homogenized at RT by means of a vortex homogenizer (IKA, MS 2). After 1 week the transmittances were measured by means of a photometer (Dr. Lange digital photometer LP 1 W, 1 cm cuvette diameter, 650 nm) and the particle sizes by means of DLS (Brookhaven, BIC 90), and the particle number diameter was determined (log-normal representation, particle number weighting). The particle size measurements were made from 10-fold dilutions of the isocyanate/lithium molybdate dispersions in butyl acetate after 30-minute ultrasound bath treatment.

|  | Teilchendurchmesser | |
| --- | --- | --- |
|  | Probe A [nm] | Probe B [nm] |
| Desmodur N 3300 | 145 | 151 |
| Bayhydur 3100 | 174 | 106 |
| Bayhydur XP 2487 | 80 | 94 |
| Bayhydur VPLS 2319 | 130 | 117 |
| Bayhydur LPLAS 5642 | 195 | 295 |

Example 8

Repeatability

In accordance with Example 6, a microemulsion was prepared in the W/O/S ratio of 1.26/17.8/1. This was done by mixing 25 ml of butyl acetate with 1.25 g of PLURONIC® PE 10500 (50 g/l) and 1.58 ml of 2% by weight aqueous lithium molybdate solution in a 50 ml graduated cylinder, heating the cylinder twice in a water bath at 70° C. for 2 minutes and shaking it by hand. The water was removed on a rotary evaporator at 40° C. and <30 mbar and the dispersion was concentrated to about 8 ml and transferred by pipette to a 50 ml graduated cylinder. After the dispersion had been made up to the initial volume of 25 ml with butyl acetate, a lithium molybdate dispersion with 1400 ppm of lithium molybdate was obtained. The particle size measurement (dynamic light scattering, particle number weighting log-normal) was carried out at a concentration of approximately 280 ppm. The preparation was repeated six times.

| Repetition | Particle diameter nm |
| --- | --- |
| 1 | 52 |
| 2 | 60 |
| 3 | 39 |
| 4 | 49 |
| 5 | 48 |
| 6 | 38 |
| Average | 48 |
| Standard deviation | +−8 |

Example 9

Precipitation of NaCl 1.58 ml of a 2% strength by weight sodium chloride solution in water were added to a solution of 50 g/l PLURONIC® PE10500 in 25 ml of butyl acetate. After the emulsion had been conditioned to 70° C., with occasional shaking, and cooled to RT, it was concentrated to about 3 ml on a rotary evaporator at 40° C. and then made up to 25 ml with butyl acetate. With a lithium molybdate concentration of 1400 ppm, dynamic light scattering (particle number weighting, log-normal evaluation) gave a particle size of 196 nm.

Example 10

Curing Kinetics, Coatings Properties

Performance example for the mode of action of the nanoscale catalyst for accelerating the 2K PU reaction in an aqueous 2K PU clearcoat.

TABLE 1

Formulation of an aqueous 2K PU clearcoat

|  | Comparative (parts by weight) | Inventive (parts by weight) |
|---|---|---|
| Component 1 | | |
| Polyol component (b): BAYHYDROL ® A145[4] (OH content 3.3%, 45% solids) | 61.2 | 61.2 |
| SURFYNOL ® 104[1] | 1.4 | 1.4 |
| BORCHIGEL ® PW 25[2] | 0.2 | 0.2 |
| BAYSILONE ® VP AI 3468[3] | 1.1 | 1.1 |
| Ratio of isocyanate to polyol | 1.5:1 | 1.5:1 |
| Component 2 | | |
| Polyisocyanate component (a): BAYHYDUR ® VP LS 2319 (80% by weight in butyl acetate) | 18.4 | 18.4 |
| Total comp. 1 + comp. 2 | 23 | 23 |
| Butyl acetate | 4.6 | 4.6 |
| Water added to set efflux time of 25 sec. To DIN 4, based on 100.0 g solids | 46.5 | 46.5 |

MR = mass ratio
[1]Air Products NL, additive for improving flow, substrate wetting, defoaming;
[2]Borchers GmbH, Monheim, PU thickener,
[3]Borchers GmbH, Monheim, slip additive 4) BAYHYDROL® A145 water-dilutable, OH-functional polyacrylate dispersion, approximately 45% in water/solvent naphtha 100/2-butoxyethanol, neutralized with dimethylethanolamine, ratio about 45.6:4:4:1.4, viscosity at 23° C., D approximately 40 $s^{-1}$ 950±550 mPa·s, according to DIN EN ISO 3219/A.3, OH content, resin solids (calculated) about 3.3%. Bayer MaterialScience AG.

The lithium molybdate catalyst (c) was obtained as the coarsely crystalline salt from Aldrich and, following inventive preparation of the nanoparticulate form, in the stated amount of butyl acetate, was used in the inventive example. In the inventive example it is contained in the amount of butyl acetate. Relative to the solids content of the coating system, the amount of lithium molybdate was 250 ppm in the inventive example.

All of the components of the stock coating material (component 1) were mixed with one another and degassed. Subsequently the coating components (components 1 and 2) were mixed by means of a dissolver at 2000 rpm for 2 minutes. The catalyst in butyl acetate was added, prior to application, to the finished coating mixture and then incorporated mechanically as described above. The coating film was knifecoated onto a glass plate using a coating knife.

The following drying times were observed:

| Drying | Comparative | Inventive |
|---|---|---|
| RT | 2.5 | ¾ |
| T1 | 3.5 | 2 |
| T2 | 6 | 3 |
| T3 | >7.5 | 5.5 |
| T4 | | |

The samples were left to evaporate at room temperature for a period of 10 minutes and then were crosslinked at a temperature of 60° C. over a period of 30 minutes.

The measurement took place in accordance with DIN 53150.

In the inventive example the catalyst leads to a significantly accelerated drying, which is in some cases 2 to 3 times quicker than without catalyst. This demonstrates the action of the catalyst.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process comprising:
   I) preparing a water-in-oil emulsion comprising
      A) an aqueous solution comprising one or more water-soluble compounds selected from the group consisting of lithium molybdate, sodium molybdate, zinc molybdate and mixtures thereof,
      B) an organic solvent and
      C) a stabilizer;
   and
   II) removing water from the emulsion down to a residual water content of not more than 2% by weight, to provide organic media-dispersible nanoparticles of the one or more water-soluble compounds.

2. A process according to claim 1, characterized in that the water-soluble compounds have solubilities of 1 to 89.6 g/100 g of water at 25° C.

3. A process according to claim 1, wherein the organic solvent or solvent mixture is selected from the group consisting of butyl acetate, methoxypropyl acetate, ethyl acetate, caprolactone, heavy aromatic naphtha, toluene, xylene and mixtures thereof.

4. A process according to claim 1, wherein the stabilizers comprise block copolymers having PEO-PPO-PEO blocks and molar masses of 2000 to 10 000 g/mol.

5. A process according to claim 1, wherein the water-in-oil emulsion obtained after steps A) to C) has a composition of 2% to 10% by weight of water, 79% to 97% by weight of organic solvent, 0.01% to 1% by weight of salt precipitated in nanoparticle form and 0.1% to 10% by weight of stabilizer.

6. A process according to claim 1, wherein after step II) the emulsion has a water content of less than 0.5% by weight.

7. Organic media-dispersible nanoparticles of water-soluble compounds prepared according to claim 1, said nanoparticles having an average particle size of less than 500 nm.

8. Organic media-dispersible nanoparticles of water-soluble compounds according to claim 7, wherein the nanoparticles have an average particle size of less than 150 nm.

9. Organic media-dispersible nanoparticles of water-soluble compounds according to claim 7, wherein the nanoparticles are lithium molybdate particles having an average particle size of 5 to 60 nm.

10. Dispersions comprising organic media-dispersible nanoparticles of water-soluble compounds according to claim 7.

11. Dispersions according to claim 10, further comprising isocyanates.

12. Coatings prepared from organic media-dispersible nanoparticles of water-soluble compounds according to claim 7.

13. Substrates coated with coatings according to claim 12.

14. The process according to claim 1, wherein the resulting organic media-dispersible nanoparticles of the one or more water soluble compounds have an average particle size of less than 500 nm.

* * * * *